Patented Oct. 17, 1933

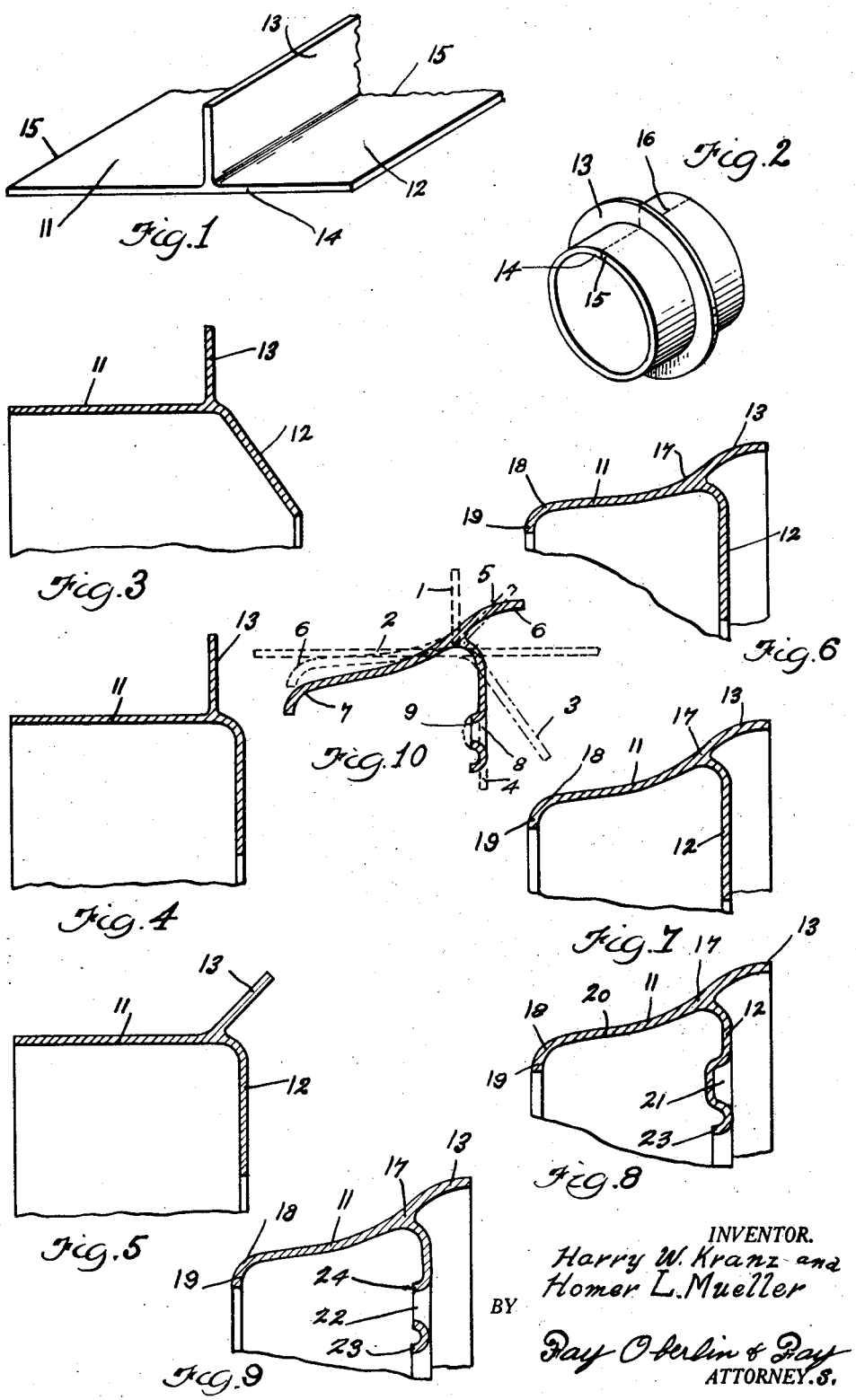

1,931,161

UNITED STATES PATENT OFFICE 1,931,161

METHOD OF MAKING TUBULAR ARTICLES

Harry W. Kranz, Lakewood, and Homer L. Mueller, Cleveland, Ohio, assignors to The Cleveland Welding Company, Cleveland, Ohio, a corporation of Ohio Application October 17, 1929. Serial No. 400,233

6 Claims. (Cl. 29—159.3)

The present invention relates to tubular articles and methods of making the same and one of its objects is to provide a method whereby such tubular articles can be made of a single blank of material thereby effecting considerable saving in the cost of producing such article and at the same time produce an article having a strength and rigidity which is not possible with the method of manufacture commonly employed. Other objects of this invention will become apparent as the description proceeds.

More particularly our invention contemplates a process which involves the circularizing of a flat blank of suitable metal such as steel having a longitudinal flange integrally formed therewith on one side thereof, and then working and forming of the resulting flanged tube in such a manner as to obtain some predetermined distribution and structure of the metal in the article being produced. One method of accomplishing the objects of our invention is to circularize a T-shaped blank into a flanged tubular element by uniting the adjacent edges of such blank after it has been rolled into shape by welding and then working the metal comprising such tubular element into the form of a tubular hub shell of varying diameter adapted to be used as a hub element for a wire spoke wheel commonly used in the construction of automobiles and like vehicles.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a fragmentary isometric view of the blank employed in producing the tubular article; Fig. 2 is a perspective view of the T-shaped blank after it has been circularized; Figs. 3 to 9 inclusive are fragmentary sectional views showing the various forms of the tubular shell during the successive forming operations; Fig. 10 is a diagrammatic composite view of the various shapes of the element during the forming process.

Referring more specifically to the drawing and more especially to Fig. 1, the blank here shown consists of horizontal legs 11 and 12 and a vertical leg or stem 13. The length of the blank depends on the circumference of the tubular element to be formed. The T-shaped blank shown in Fig. 1 after being suitably deformed or circularized will appear as shown in Fig. 2, the abutting edges 14 and 15 being suitably welded or otherwise joined along the line 16. After the blank has been so circularized, the portion 12 which lies on one side of the circumferential flange 13 is suitably reduced in diameter along the lines indicated in Fig. 3 after which such element 12 is formed into an inwardly extending circumferential flange as shown in Fig. 4. The circumferential flange 13 is then axially deformed as shown in Fig. 5 and further deformed to correspond to the contour thereof illustrated in Fig. 6. After the circumferential flange 13 has been so axially deformed, the portion 17 of the tubular element which is encompassed by the flange 13 is enlarged in diameter to effect the proper distribution of the metal and the terminal portion 18 on the opposite end of the tubular element is shrunk as shown in Fig. 7 to further bring about this desirable distribution of the metal, the terminal portion 18 having been previously formed into an inwardly directed circumferential flange 19. The next step in the forming process is the further shrinking of the medial portion 20 along with the terminal portion 18 which may be accomplished simultaneously with the forming of the cup shaped indentations 21 in the inwardly directed circumferential flange 12. The last operation consists of forming apertures 22 in the cup shaped indentations 21 and rebending the inner edges 23 of the inwardly directed circumferential flange 12. The cutting out of the bottom portions of the cup shaped indentations 21 leaves annular shoulders 24 surrounding the apertures 22 which are now adapted to receive the bolts by which the hub shell structure is secured. In Fig. 10, the numerals appearing thereon from 1 to 9 inclusive respectively designate the various positions of the different portions of the T-shaped flange during the process of forming it into the finished hub shell shown by the fragmentary section view of Fig. 9. The apparatus for accomplishing the aforementioned results may consist of any number of suitable devices but the deformation of the T-shaped blank into the tubular element shown in Fig. 2 may be accomplished by means of a three-roll type pyramid forming machine or such tubular form may be accomplished by bumping or rounding the blank on a press or bulldozer or in dies or other suitable machines. The adjacent edges 14 and 15 of the tubular element are welded on an electric butt welder or automatic electric flash welder by clamping such ends in welding dies with opposite polarity and heating such ends so that the metal can properly unite. After the welding process is completed, the burr or flash which is necessarily incident to such welding and which occurs along the welded seam may be removed by a special shearing fixture mounted on a bulldozer or other suitable machine after which the sheared surface is suitably ground in a grinding lathe specially designed for handling the units in multiple. The contracting or shrinking of the portion 12 into an inwardly directed circumferential flange as illustrated by Figs. 3 and 4 is accomplished in a high powered mechanical or hydraulic type press with suitable blocks or dies. This curling and shrinking process increases the thickness of the metal in this portion of the tubular element and presents the proper strength to the portion of the hub shell which is called upon to carry the greatest amount of stress to which such shell or hub is subjected.

The axial deformation of the outwardly projecting circumferential flange 13 as illustrated in Fig. 5 may be accomplished in any suitable type of machine in which the flange is so rolled or pressed into shape. After the flange 13 has been so rolled or pressed into shape, the portion 17 of the tubular element is stretched in a special expanding chuck which enlarges the diameter of the shell at this point over the initial diameter as shown in Fig. 2. The formation of the inwardly circumferential flange 19 on the terminal portion 18 may be effected by a suitable curling die operated by mechanical or hydraulic power presses for a special design machine and may be preformed preliminary to the stretching process. The shrinking process to which the terminal portion 18 is thereupon subjected to as illustrated in Fig. 7 may be accomplished by a shrinking machine having a plurality of radially contracting segmental dies operated either mechanically or hydraulically and which accomplish this deformation without a breaking or a curling of the terminal portion 18 and the circumferential flange 19. The formation of the cup shaped indentations 21 and the rebent ends 23 of the inwardly directed circumferential flange 12 may be accomplished by the operation of a suitable die actuated by either mechanical or hydraulic press of sufficient capacity to form such indentations with well defined outline. The apertures 22 may be formed by either drilling out the bottom of the cup shaped indentations 21 or by punching and then facing off the bottom of such apertures to present the annular bearing surfaces 24 around such apertures which will serve as a suitable bearing for the bolt heads securing the hub in its assembled position.

From the foregoing description, it will be apparent that a hub shell can be formed in which a proper distribution of the metal is effected according to the stresses which the various portions of the structure are subjected to as well as the formation of the complete hub shell out of a single blank without the necessity of assembling several blanks which has the undesirable features of excessive cost as well as inferior resulting strength.

A further advantage which is apparent in connection with our present method of forming such tubular articles is that the long axes of the fibers in the finished article will extend circumferentially thereof, which arrangement of the fibers materially adds to the strength and rigidity of the finished product. The diameter of the blank as illustrated in Fig. 2 is shown of a slightly smaller diameter than that of the finished hub shell at the portion 17 and is of a slightly larger diameter than the terminal portion 18 of the finished article. This relation in the magnitude of the various dimensions permits the article to be formed without an excessive stretching or shrinking in either of the above mentioned portions and still permits of the differences of magnitude of these dimensions which could not be accomplished were the shrinking process or the stretching process respectively relied upon to entirely accomplish this variation in the diameter of the two portions.

Other forms may be employed embodying the features of our invention instead of the one here explained, change being made in the form or construction, provided the elements stated by any of the following claims or the equivalent of such stated elements be employed, whether produced by our preferred method or by others embodying steps equivalent to those stated in the following claims.

We therefore particularly point out and distinctly claim as our invention:—

1. In the manufacture of flanged tubular articles of varying diameter, the method comprising the tubulation of a flat blank having a longitudinal flange extending therefrom intermediately of its sides, reducing the diameter of a portion of such tubular element, enlarging the diameter of the portion of such tubular element encompassed by said flange, forming the portion of said tubular article on one side of said flange into a circumferential flange, and then axially deforming said flange.

2. In the manufacture of flanged tubular articles, the method comprising the tubulation of a flanged blank, forming inwardly directed circumferential flanges on both ends of such tubular element, enlarging the diameter of the portion of such tubular element encompassed by said flange, forming apertures in one of such circumferential flanges, and then axially deforming the first named flange.

3. In the manufacture of flanged tubular articles, the method comprising the forming of a flanged blank into a tubular element having an outwardly extending circumferential flange, forming inwardly extending circumferential flanges on the ends of such tubular element, enlarging the diameter of the portion of such tubular element encompassed by said flange, axially deforming said outwardly extending circumferential flange, and then forming apertures in one of said inwardly extending circumferential flanges.

4. In the manufacture of flanged tubular articles of varying diameter, the method comprising the forming of a flanged blank into a tubular element having an outwardly extending circumferential flange, axially deforming said flange, reducing the diameter of one terminal portion of such tubular element, enlarging the diameter of the portion of such tubular element encompassed by said flange, forming inwardly extending circumferential flanges on the respective ends of such tubular element, forming apertures in one of such inwardly extending circumferential flanges, said apertures surrounded by struck-up annular seats, and rebending the inner periphery of one of such inner flanges.

5. In the manufacture of flanged tubular articles of varying diameter, the method comprising the tubulation of a flanged blank, forming the portion of such tubular element on one side of said flange into a circumferential flange, axially deforming said first named flange, enlarging the diameter of the portion of the tubular element encompassed by said flanges and then reducing the diameter of a portion of such tubular element.

6. In the manufacture of flanged tubular articles of varying diameter, the method comprising the tubulation of a flanged blank, forming the portion of such tubular element on one side of said flange into an inwardly directed circumferential flange, axially deforming said first named flange, enlarging the diameter of that portion of said tubular element containing said flanges, reducing the diameter of the remaining portion of such tubular element, forming a circumferential flange on the end of this reduced portion and then forming apertures in said inwardly directed circumferential flange.

HARRY W. KRANZ.
HOMER L. MUELLER.